(No Model.) 2 Sheets—Sheet 1.
J. REDER.
MANUFACTURE OF ORNAMENTAL GLASS ARTICLES.
No. 389,595. Patented Sept. 18, 1888.
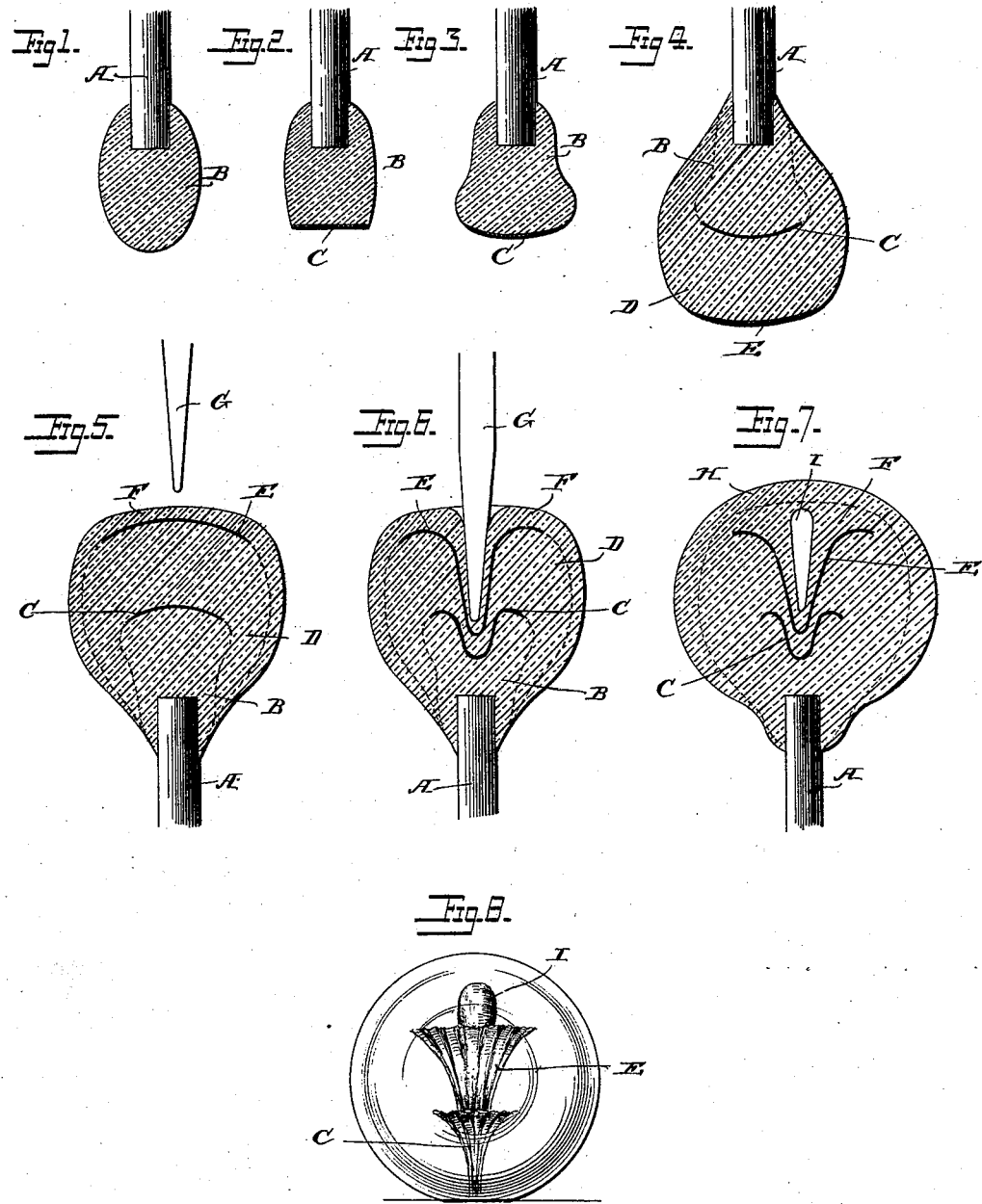
WITNESSES:
INVENTOR:
ATTORNEYS.

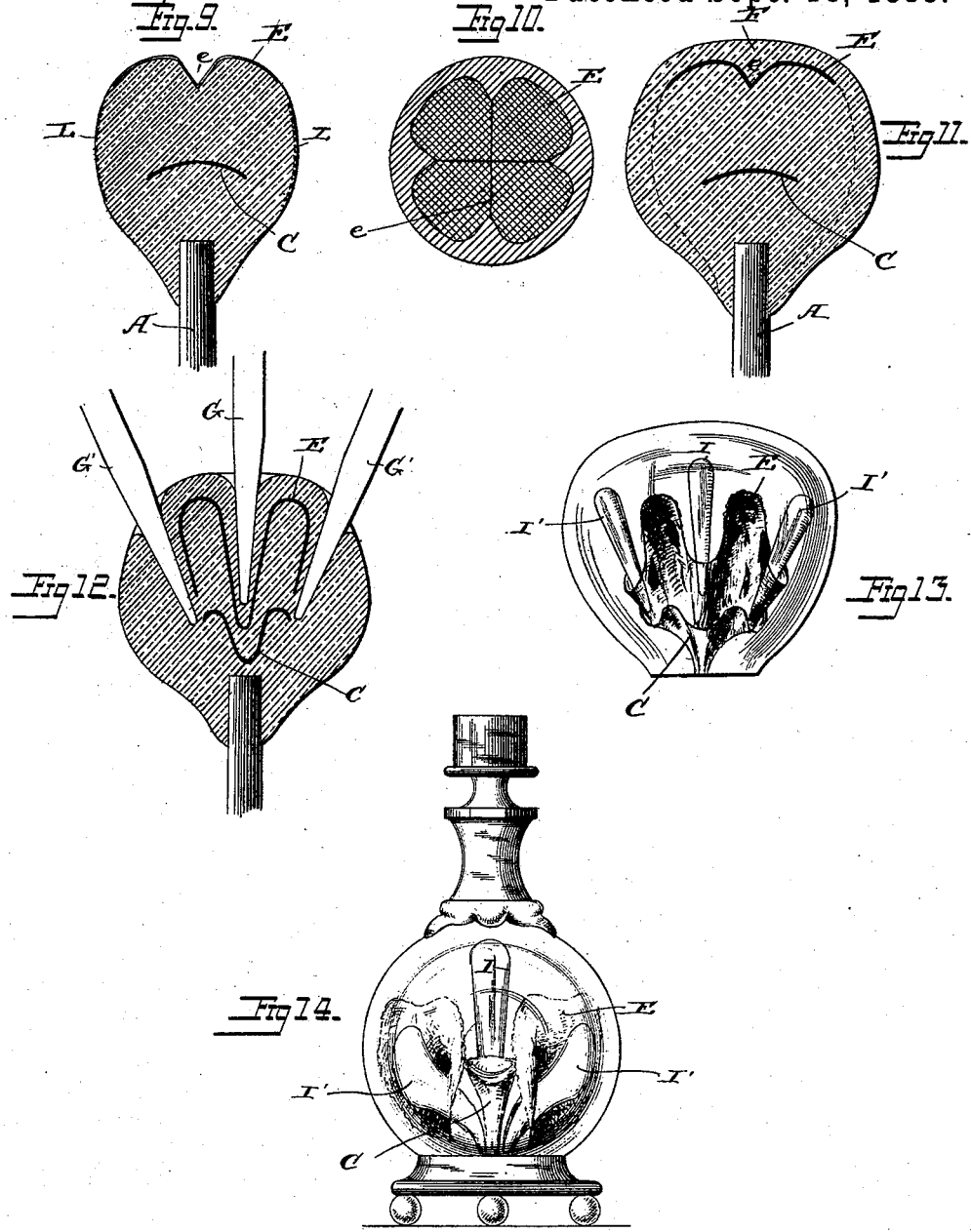

UNITED STATES PATENT OFFICE.

JOSEPH REDER, OF CREIGHTON, PENNSYLVANIA.

MANUFACTURE OF ORNAMENTAL GLASS ARTICLES.

SPECIFICATION forming part of Letters Patent No. 389,595, dated September 18, 1888.

Application filed April 30, 1888. Serial No. 272,347. (No model.)

*To all whom it may concern:*

Be it known that I, JOSEPH REDER, residing at Creighton, Allegheny county, Pennsylvania, have invented certain new and useful Improvements in the Manufacture of Ornamental Glass Articles, of which the following is a specification.

My invention relates to the manufacture of ornamental glass articles, consisting, mainly, of a transparent glass having ornamental effects produced therein by the novel arrangement of colored glass and by cavities formed therein; and it consists, besides the novelty in the articles themselves, of certain improvements in the process whereby they are manufactured.

In the drawings, Figures 1 to 7 illustrate the various steps in the process of making the article shown in Fig. 8. Figs. 9 to 12 show steps in making the article shown in Fig. 13, and Fig. 14 shows an article somewhat differently ornamented from that shown in the other figures used in connection with a burner.

In carrying out my invention the clear or transparent glass which forms the main body of the article is kept in a melted condition in a crucible or suitable receptacle in the usual manner. The colored glass or other suitable material by which the ornamental effects are produced is reduced to a powder or to small grains, and in this condition is thinly spread upon a slab. When the clear glass is in condition to be worked, a metallic rod, preferably of iron, about six feet long and three-fourths of an inch in diameter and heated to redness at one end, is dipped into the molten glass and a small portion of the latter is withdrawn from the crucible. By rotating the bar the glass is formed into the shape shown in Fig. 1, where A represents the rod, and B the mass of glass thereon. After the mass of glass upon the end of the rod has sufficiently cooled the end thereof is pressed upon the slab covered by the finely-divided colored material, which, being loose, will adhere to and be taken up by the mass of glass on the end of the rod, thus forming a coating, C, of colored material upon the end of the mass B, which has been flattened by contact with the plate. This coating may be either a film of fine powder or of separate particles of larger size, more or less closely arranged, this step of the process being illustrated in Fig. 2. By rotation of the rod and the use of a flat iron the glass is formed into a pear-shaped mass, (illustrated in Fig. 3,) the colored glass covering the outer curved end thereof. The ball or mass of glass thus formed is now dipped again into the molten clear glass, some of which is taken up, incasing the mass or ball already formed. This entire mass is now rotated by the rod in proximity to the fire to render it soft and plastic. The second addition of glass is represented by the letter D, Fig. 4, so that the film of colored glass is embedded in the larger body of glass, B D. Having been sufficiently heated, it is removed from the fire, and when at the proper temperature it is pressed softly upon a slab covered with colored particles, forming a coating, E, thereof in the same manner the coating C was produced. The mass is then shaped as shown in Fig. 4. This is next dipped into the molten glass and another transparent coating, F, applied thereon, and the rod with the body of glass thereon is rotated in the presence of the fire until the entire mass assumes the form shown in Fig. 5. The mass thus formed is now brought to such a temperature that it may be indented by a round-ended tapering rod, G, preferably of copper, without breaking the surface of the glass. This action in pressing down the central portion of the glass carries into a funnel form both the layers, E C, of colored glass, as shown in Fig. 6. The rod G is now withdrawn, leaving the mass of glass centrally indented almost to the supporting-rod A. The mass is then dipped into molten glass and the entire mass again coated and enveloped by a layer, H, of transparent glass, the cavity formed by the rod G being closed and forming an air-cavity, I, centrally arranged relatively to the colored funnel-shaped figures. The clear glass last added is kept from filling the aperture I by inverting the mass during the coating process. The mass shown in Fig. 7 is next thoroughly heated, and then placed in a wooden former having a spherical or other shaped cavity, wherein it is pressed or molded into any desired shape. The completed article is then cut off just above the rod A, and, if desired, is annealed in any suitable manner. This process produces an article like that shown in Fig. 8, the colored ornament in the center of the ball being in the art termed a "flower," of which the part E is the "calyx" and the cavity the "stamens."

The ornamental portions C and E may be of glass of like colors or of different colors, as taste may dictate, or formed of particles of any suitable material. It will also be understood that my invention is not limited to the two colored portions C and E, as one or more might be used and still the essential features of the invention be preserved.

In Fig. 13 is shown a somewhat more elaborately ornamented ball than that shown in Fig. 8, there being besides the central air-cavity, I, a number of other air-cavities, I', arranged outside of the central one, I.

In making the ball shown in Fig. 13 the steps of the process are identical with those described for making the ball shown in Fig. 8 up to the point illustrated in Fig. 4. At this point of the process I cross, crease, or channel by means of a blunt-edged knife the end of the ball coated with the colored glass E, thereby forming grooves or channels $c$, crossing each other centrally, as illustrated in Figs. 9 and 10. If at this step in the process I proceed in the manner already described and penetrate only centrally, the article produced will resemble that shown in Fig. 8, except that the edges of the funnel-shaped calyx will be waved or fluted; but in making the article shown in Fig. 13 the next step in the process is to coat the end thus creased with a layer, F, of clear glass, as shown in Fig. 11. When this mass of glass has arrived at the proper temperature, it is centrally indented at different points by a number of rods, G G', as shown in Fig. 12. The article is then finished in the manner described for finishing the ball shown in Fig. 8, forming an article like that shown in Fig. 13.

In Fig. 14 an article having somewhat different ornamentation from that shown in the other figures is illustrated as forming part of a stand for a burner. In this instance the leaves or colored portions E, which surround the cavities I', are separated from each other, their edges being turned or bent outward somewhat, instead of being united, as in Fig. 13. This effect I may produce by coating the glass with the colored material upon the sides, as shown at L L, Fig. 9. The separate portions of the colored glass E are then punctured by the rods G', which in the article shown have broken and passed through the colored glass E, while at the same time it has folded the same, as well as the glass C, to a certain extent.

It will be readily seen without further description of various articles produced by my invention that it admits of much variation in detail, whereby a great number of differently-ornamented articles may be produced.

The articles thus produced are suitable for many ornamental purposes, according to their sizes and shapes — as, for instance, paper-weights, parts of brackets or stands for lamps, &c., or in use in decoration in connection with other materials.

I claim—

1. The herein-described process of making ornamental glass articles, consisting in coating a mass of glass with particles of other material, indenting the mass to fold down the coating, then coating the mass thus formed with transparent glass, and molding the article to its completed form, substantially as described.

2. The herein-described process of making ornamental glass articles, consisting in coating a mass of glass with particles of ornamenting material, then coating the ornamenting material with transparent glass, then indenting the mass, and subsequently coating the mass with clear glass, substantially as described.

3. The herein-described process of making ornamental glass articles, consisting in coating a mass of glass with particles of other materials, indenting the mass to infold the said coating, and then coating the mass to close without filling the aperture formed by said indenting, substantially as described.

4. The herein-described process of making ornamental glass articles, consisting in shaping a mass of glass, then while plastic pressing the same upon a surface covered with loose divided material to coat the mass of glass, subsequently penetrating the mass of glass, and then coating the whole with transparent glass, substantially as described.

5. The herein-described process of making ornamental glass articles, consisting in coating the surface of a mass of glass with successive layers of ornamenting material and transparent glass, and penetrating the mass to fold the layers into substantial funnel form, substantially as described.

6. In the manufacture of ornamental glass articles, applying successive layers of colored material and transparent glass to a mass of heated glass, and forming air-openings in the mass by indenting the same before applying the final transparent coating, substantially as described.

7. The herein-described process of making ornamental glass articles, consisting in coating a mass of glass with ornamenting material, creasing or folding the coated portion of the glass, and indenting the mass to fold the coated glass centrally, substantially as described.

8. The herein-described process of making ornamental glass articles, consisting in coating a mass of glass with ornamenting material, indenting such mass at different points to fold the glass, and then coating such indented mass with a covering of transparent glass, substantially as described.

9. The herein-described process of making ornamental glass articles, consisting in coating a mass of glass with ornamenting material, cross creasing or folding the coated portion of the glass, subsequently indenting such mass at different points, and then coating such mass of glass with transparent glass, substantially as described.

In testimony whereof I have signed my name to this specification in the presence of two subscribing witnesses.

JOSEPH REDER.

Witnesses:
ONZERT SREINER,
S. JOHANN SCHIFFGENS.